United States Patent
Connelly et al.

(10) Patent No.: US 7,566,475 B2
(45) Date of Patent: Jul. 28, 2009

(54) ACOUSTIC INSULATOR WITH CONTROLLED AIRFLOW RESISTANCE AND METHOD OF MAKING SAME

(75) Inventors: Terence Connelly, Plymouth, MI (US); Paul G. Deacon, Saline, MI (US); Jean-Jacques Katz, Novi, MI (US); Barry R. Wyerman, Novi, MI (US); Kenneth R. Parrish, Roseville, MI (US)

(73) Assignee: International Automotive Components Group North America, Inc., Dearborn, MI (US)

(*) Notice: Subject to any disclaimer, the term of this patent is extended or adjusted under 35 U.S.C. 154(b) by 363 days.

(21) Appl. No.: 10/904,410

(22) Filed: Nov. 9, 2004

(65) Prior Publication Data

US 2006/0099383 A1 May 11, 2006

(51) Int. Cl.
 *B05D 1/00* (2006.01)
(52) U.S. Cl. .................. 427/195; 427/201; 427/369
(58) Field of Classification Search .................. None
 See application file for complete search history.

(56) References Cited

U.S. PATENT DOCUMENTS

| | | | | |
|---|---|---|---|---|
| 4,035,215 A * | 7/1977 | Goldstone | ................ | 156/245 |
| 5,824,973 A | 10/1998 | Haines et al. | | |
| 5,841,081 A | 11/1998 | Thompson et al. | | |
| 6,145,617 A | 11/2000 | Alts | | |
| 6,153,144 A | 11/2000 | Byma | | |
| 6,197,403 B1 | 3/2001 | Brown et al. | | |
| 6,296,075 B1 | 10/2001 | Gish et al. | | |
| 6,345,688 B1 | 2/2002 | Veen et al. | | |
| 6,569,509 B1 | 5/2003 | Alts | | |
| 6,572,723 B1 | 6/2003 | Tilton et al. | | |
| 6,595,321 B1 | 7/2003 | Tompson | | |
| 6,669,265 B2 | 12/2003 | Tilton et al. | | |
| 2002/0117352 A1 | 8/2002 | Veen et al. | | |
| 2006/0037815 A1 * | 2/2006 | Schabel | ................ | 181/290 |

FOREIGN PATENT DOCUMENTS

| | | |
|---|---|---|
| DE | 199 53 717 C2 | 5/2001 |
| EP | 0 363 130 B1 | 5/1994 |
| FR | 2 859 477 A | 3/2005 |
| GB | 1 552 922 A | 9/1979 |
| GB | 2 064 988 A | 6/1981 |
| GB | 2 082 936 A | 3/1982 |
| JP | 62-48545 | 3/1987 |
| JP | 4-9898 | 1/1992 |
| JP | 11 133980 A | 5/1999 |
| WO | 98/18657 A1 | 5/1998 |

OTHER PUBLICATIONS

English Abstract corresponding to DE 199 53 717.
English Abstract corresponding to EP 0 363 130.

* cited by examiner

*Primary Examiner*—Frederick J Parker
(74) *Attorney, Agent, or Firm*—Brooks Kushman P.C.

(57) ABSTRACT

A method of making an acoustic insulator includes depositing thermoplastic particulate on a first surface of a base layer. The method further includes heating the particulate such that the particulate at least partially melts and penetrates the first surface of the base layer, thereby increasing density and airflow resistance of the base layer proximate the first surface such that the base layer has an areal mass in the range of 0.1 to 1.0 kg/m$^2$ and an airflow resistance in the range of 300 to 5,000 Nsm$^{-3}$ proximate the first surface.

20 Claims, 2 Drawing Sheets

ACOUSTIC INSULATOR WITH CONTROLLED AIRFLOW RESISTANCE AND METHOD OF MAKING SAME

BACKGROUND OF THE INVENTION

1. Field of the Invention

The invention relates to an acoustic insulator and method of making the same.

2. Background Art

Acoustic insulators are frequently used in applications such as motor vehicles and buildings to attenuate sound. Examples of acoustic insulators are disclosed in U.S. Pat. Nos. 6,145,617; 6,296,075 and 6,669,265.

SUMMARY OF THE INVENTION

Under the invention, a method of making an acoustic insulator includes depositing thermoplastic particulate on a first surface of a base layer. The method further includes heating the particulate such that the particulate at least partially melts and penetrates the first surface of the base layer, thereby increasing density and airflow resistance of the base layer proximate the first surface such that the base layer, proximate the first surface, has an areal mass in the range of 0.1 to 1.0 kg/m$^2$ and an airflow resistance in the range of 300 to 5,000 Nsm$^{-3}$.

Further under the invention, an acoustic insulator for attenuating sound is provided. The insulator includes a base layer having first and second portions, and fill material that penetrates into the first portion of the base layer. The fill material cooperates with the first portion to form a densified skin having an areal mass in the range of 0.1 to 1.0 kg/m$^2$ and an airflow resistance in the range of 300 to 5,000 Nsm$^{-3}$.

While exemplary embodiments in accordance with the invention are illustrated and disclosed, such disclosure should not be construed to limit the claims. It is anticipated that various modifications and alternative designs may be made without departing from the scope of the invention.

DETAILED DESCRIPTION OF THE PREFERRED EMBODIMENT(S)

Figure 1:
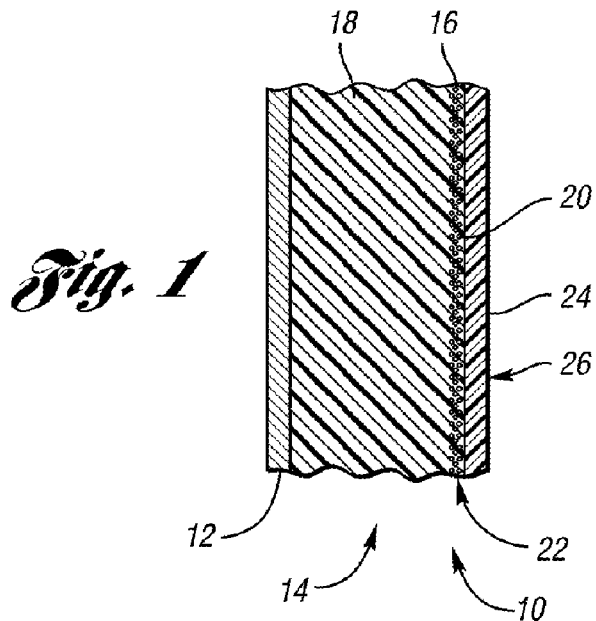
FIG. 1 is a fragmentary cross-sectional view of an acoustic insulator according to the invention mounted on a vehicle part.

FIG. 1 shows an acoustic insulator 10 according to the invention. The insulator 10 is shown mounted on a vehicle part 12, such as a vehicle floor, roof, door panel, trunk lid, interior engine compartment wall, or exterior engine compartment wall. Alternatively, the insulator 10 may be used in any suitable application. For example, the insulator 10 may be mounted on a wall or floor of a building.

The insulator 10 includes a base layer 14, such as a pad or mat, that may be made of any suitable material. For example, the base layer 14 may be a foam layer, such as a thermoplastic foam layer, or a fibrous layer that comprises natural and/or synthetic fibers. In one embodiment of the invention, the base layer 14 comprises thermoplastic fibers.

The insulator 10 further includes fill material 20 that at least partially fills voids in a first portion 16 of the base layer 14. As a result, the fill material 20 cooperates with the first portion 16 to form a densified, consolidated region or skin 22 having a greater density and airflow resistance compared to a second portion 18 of the base layer 14. The material of the first portion 16 may also be densified as described below, to further increase the density and airflow resistance of the skin 22.

In one embodiment of the invention, the skin 22 has a mass per unit area or areal mass in the range of 0.1 to 1.0 kilograms per square meter (kg/m$^2$), a thickness in the range of 0.5 to 10 millimeters (mm), and an airflow resistance in the range of 300 to 5,000 newton-second per cubic meter (Nsm$^{-3}$), while the second portion 18 has an areal mass in the range of 0.3 to 1.6 kg/m$^2$, a thickness in the range of 3 to 40 mm, and an airflow resistance in the range of 40 to 1,500 Nsm$^{-3}$. Alternatively, the skin 22 and second portion 18 may each be formed with any suitable areal mass, thickness and airflow resistance.

The insulator 10 may also include one or more additional layers placed on or proximate the base layer 14. In the embodiment shown in FIG. 1, for example, the insulator 10 includes a cover layer 24 for providing an appearance surface 26 that faces toward an interior vehicle compartment (not shown). The cover layer 24 may comprise any suitable material, such as natural or synthetic fibers.

Figure 2:
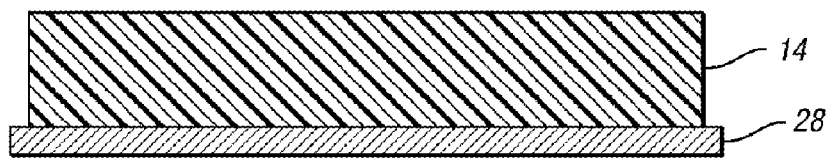
FIG. 2 is a schematic side view of a base layer used to make the acoustic insulator, wherein the base layer is shown positioned on a lower mold section.
Figure 3:
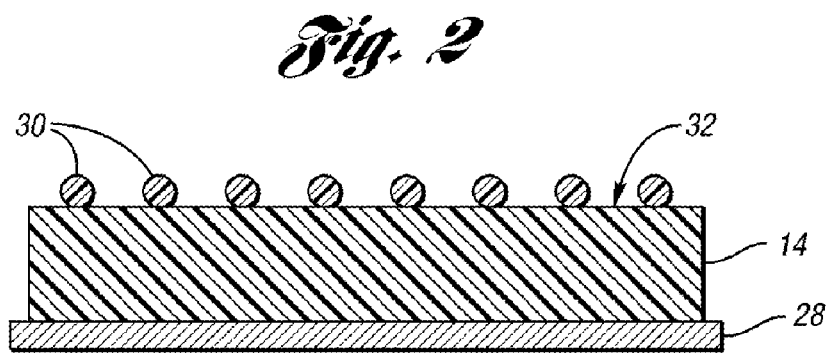
FIG. 3 is schematic side view similar to FIG. 2, showing thermoplastic particulate deposited on the base layer.
Figure 4:
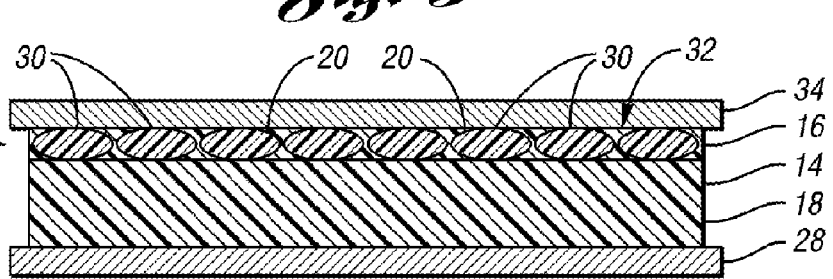
FIG. 4 is a schematic side view of the base layer and particulate, showing the particulate penetrating the base layer and filling voids in the base layer.

Referring to FIGS. 2-4, a method of making the insulator 10 will now be described. First, referring to FIG. 2, base layer 14 is positioned on a lower mold section 28. At this stage, the base layer 14 may have a generally uniform density or a density that varies from top to bottom. In one embodiment of the invention, the base layer 14 initially has a generally uniform areal mass in the range of 0.4 to 2.0 kg/m$^2$, and a thickness in the range of 3 to 55 mm. Moreover, the base layer 14 is preferably formed from a single sheet of homogeneous starting material, such as a sheet of fibrous material or a sheet of foam material.

Next, referring to FIG. 3, thermoplastic particulate 30 is deposited on a first surface 32 of the base layer 14. The particulate 30 may comprise any suitable thermoplastic material, such as low density or high density polyethylene, polypropylene, polyethylene terephthalate, or blends thereof, that is formed as particles, such as beads, pellets, flakes, granules, spheres, powder and/or fibers. Furthermore, each particle may have any suitable size and shape. For example, each particle may have a width or diameter in the range of 4 to 1,000 microns. As another example, the particulate 30 may include a mix of relatively large particles, which each have a width or diameter in the range of 100 to 1,000 microns, and relatively small particles, which each have a width or diameter in the range of 4 to 100 microns. In one embodiment of the invention, the particulate 30 includes a mix of large and small particles, wherein each large particle is generally at least ten times larger than each small particle.

The method then involves heating the particulate 30 such that the particulate 30 at least partially melts and passes into the base layer 14. In the embodiment shown in FIG. 4, the particulate 30 is heated with a heated upper mold section 34 that is pressed against at least a portion of the particulate 30.

The at least partially melted particulate 30 may penetrate through the first surface 32 and into the base layer 14 to any suitable depth as a result of the applied heat and pressure. For example, the particulate 30 may penetrate the base layer 14 to a depth in the range of 0.1 to 10 mm.

The melted particulate 30 at least partially fills spaces or voids in the base layer 14 located in or proximate to the first surface 32, thereby increasing the density and airflow resistance of the first portion 16 of the base layer 14. Upon cooling, the melted particulate 30 forms the fill material 20, which may generally retain the original configuration of the particulate 30. As another example, multiple particles may fuse together to form larger masses. In any case, the fill material 20 cooperates with first portion 16 of the base layer 14 to form skin 22.

In addition to the increased density and airflow resistance imparted by the particulate 30/fill material 20, the material of the first portion 16 may also be densified during the above process. For example, the elevated temperature and pressure applied by the upper mold section 34 may cause the material of the first portion 16 to be pressed and fused together. As a more detailed example, if the base layer 14 comprises generally resilient thermoplastic fibers, the fibers of the first portion 16 may be pressed and fused together during the manufacturing process to form densified fibrous material, while the second portion 18 may remain generally resilient.

Cover layer 24, or any other additional layer or layers, may be applied to base layer 14 after formation of the skin 22. For example, the cover layer 24 may be adhesively attached to the base layer 14 in a subsequent molding operation. Alternatively, the cover layer 24 may be omitted if not required for a particular application.

Advantageously, the airflow resistance of the insulator 10 can be effectively controlled without adding additional layers, such as scrim layers, to the insulator 10. More specifically, the airflow resistance of the skin 22 can be effectively controlled based on such factors as the size and amount of the particulate 30, penetration depth into the base layer 14, the amount of open surface area (not covered by particulate 30) of the first surface 32, and the amount of heat and pressure applied to the base layer 14 during the manufacturing process. Furthermore, the above process may also be applied to a side of the base layer 14 opposite the skin 22, so that the insulator 10 is formed with two skins 22.

Figure 5:
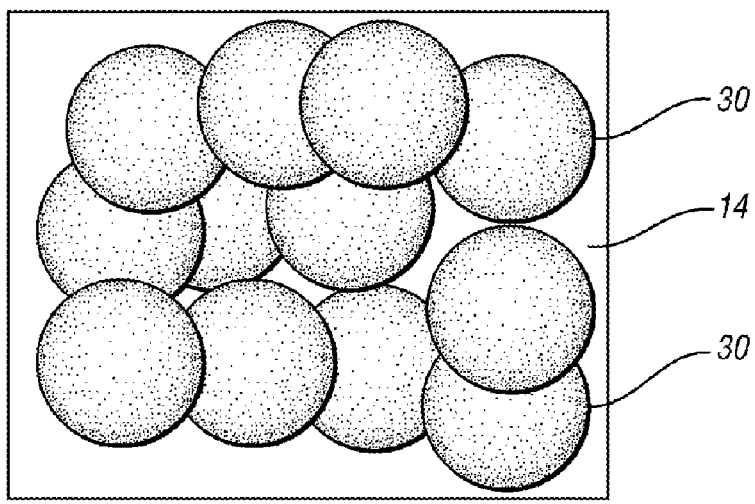
FIG. 5 is a schematic top view of the acoustic insulator showing relatively large particles embedded in the base layer.
Figure 6:
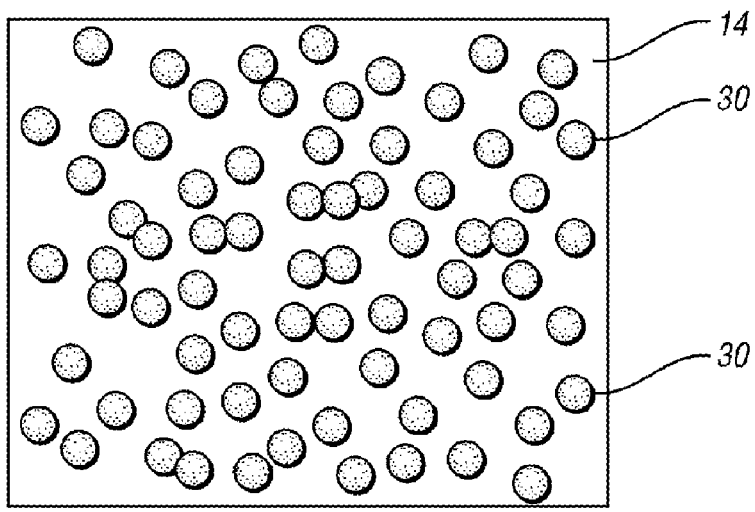
FIG. 6 is a schematic top view of the acoustic insulator showing relatively small particles embedded in the base layer.
Figure 7:
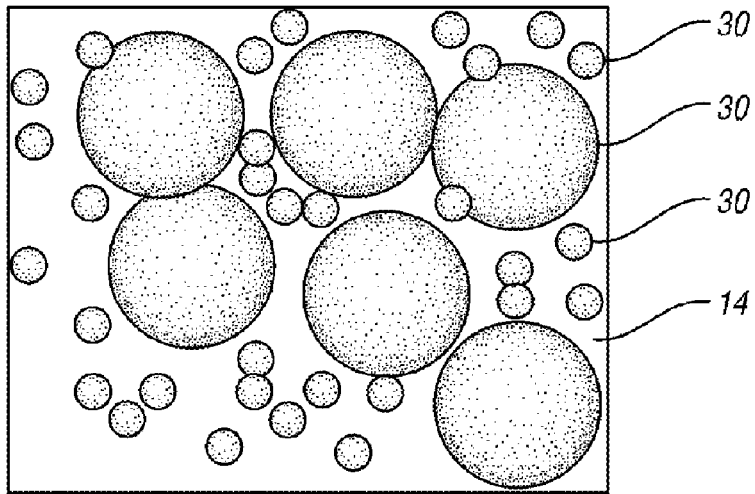
FIG. 7 is a schematic top view of the acoustic insulator showing a mix of large and small particles embedded in the base layer.

FIGS. 5-7 show examples of particulate/fill material configurations for achieving different airflow resistance targets. In the embodiment shown in FIG. 5, the particulate 30 includes relatively large particles randomly deposited on the base layer 14, wherein each particle has a diameter in the range of 100 to 1,000 microns. In the embodiment shown in FIG. 6, the particulate 30 includes relatively small particles randomly deposited on the base layer 14, wherein each particle has a diameter in the range of 4 to 100 microns. In the embodiment shown in FIG. 7, the particulate 30 includes a mix of small and large particles randomly deposited on the base layer 14. Each small particle has a first general diameter in the range of 4 to 400 microns, and each large particle has a second general diameter in the range of 40 to 1,000 microns. While not required, the second general diameter may be at least five times greater than the first general diameter. In one embodiment of the invention, the second general diameter is at least ten times greater than the first general diameter.

It should also be noted that the first portion 16 of the base layer 14 may be densified prior to application of the particulate 30. For example, a heated mold section may be pressed against the base layer 14 prior to application of the particulate.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of making an acoustic insulator, the method comprising:
   depositing a composition consisting of thermoplastic particulates on a first surface of a base layer; and
   heating the particulate such that the particulate at least partially melts and penetrates the first surface of the base layer, thereby increasing density and airflow resistance of the base layer proximate the first surface such that the base layer, proximate the first surface, has an areal mass in the range of 0.1 to 1.0 kg/m$^2$ and an airflow resistance in the range of 300 to 5,000 Nsm$^{-3}$ after the depositing and heating steps to form the acoustic insulator;
   wherein, after the depositing and heating steps: 1) a majority of the particulate is disposed within a first portion of the base layer adjacent the first surface, the first surface being an outer surface of the base layer; 2) the first portion has an areal mass in the range of 0.1 to 1.0 kg/m$^2$ and an airflow resistance in the range of 300 to 5,000 Nsm$^{-3}$; and 3) the base layer has a second portion disposed away from the first surface and having a different density compared to the first portion.

2. The method of claim 1 wherein the particulate includes particles that each have a diameter in the range of 100 to 1,000 microns.

3. The method of claim 1 wherein the particulate includes particles that each have a diameter in the range of 4 to 100 microns.

4. The method of claim 1 wherein the particulate includes first and second particles, each first particle having a first general diameter, and each second particle having a second general diameter that is at least five times greater than the first general diameter.

5. The method of claim 4 wherein the first general diameter is in the range of 4 to 100 microns, and the second general diameter is in the range of 100 to 1,000 microns.

6. The method of claim 1 wherein the melted particulate penetrates into the base layer a distance in the range of 0.5 to 10 mm.

7. The method of claim 1 wherein after the heating step, the base layer has an areal mass in the range of 0.3 to 1.0 kg/m$^2$ and an airflow resistance in the range of 1,500 to 5,000 Nsm$^{-3}$ proximate the first surface of the base layer.

8. The method of claim 1 wherein after the heating step, the second portion comprises a resilient portion having an areal mass in the range of 0.3 to 1.6 kg/m$^2$.

9. The method of claim 1 wherein the base layer comprises a thermoplastic fibrous material, and the particulate includes particles that comprise any one of polyethylene, polypropylene and polyethylene terephthalate.

10. The method of claim 1 wherein the base layer has a generally uniform density prior to the depositing step.

11. The method of claim 1 wherein, prior to the depositing step, the base layer has a consolidated portion proximate the first surface and a resilient portion disposed away from the first surface.

12. A method of making an acoustic insulator, the method comprising:
- depositing a composition consisting of thermoplastic particulates on a first surface of a thermoplastic fibrous layer, the fibrous layer having a generally uniform areal mass in the range of 0.4 to 2.0 kg/m² prior to the depositing step; and
- heating the particulate with a mold tool, such that the particulate at least partially melts and passes into the fibrous layer to form a densified skin with a portion of the fibrous layer disposed proximate the first surface, the skin having an areal mass in the range of 0.1 to 1.0 kg/m² and an airflow resistance in the range of 300 to 5,000 Nsm$^{-3}$;
- wherein the heating step includes pressing the mold tool against at least a portion of the particulate, and wherein, after the depositing and heating steps to form the acoustic insulator, a majority of the particulate is disposed within the portion of the fibrous layer proximate the first surface, and the fibrous layer has an additional portion disposed away from the first surface and having an areal mass in the range of 0.3 to 1.6 kg/m² and an airflow resistance in the range of 40 to 1,500 Nsm$^{-3}$.

13. The method of claim 12 wherein the skin has a thickness in the range of 0.5 to 10 mm.

14. The method of claim 12 wherein after the heating step, the additional portion comprises a resilient portion disposed proximate the skin, the resilient portion having an areal mass in the range of 0.3 to 1.6 kg/m².

15. The method of claim 1 wherein the first portion has a first thickness, and the second portion has a second thickness greater than the first thickness.

16. A method of making an acoustic insulator, the method comprising:
- depositing a composition consisting of thermoplastic particulates on an outer first surface of a base layer; and
- heating the particulate such that the particulate at least partially melts and penetrates the first surface of the base layer to fill voids in a first portion of the base layer proximate the first surface, thereby increasing density and airflow resistance of the first portion such that the first portion has an areal mass in the range of 0.1 to 1.0 kg/m² and an airflow resistance in the range of 300 to 5,000 Nsm$^{-3}$ after the depositing and heating steps to form the acoustic insulator;
- wherein, after the depositing and heating steps, a majority of the particulate is disposed in the first portion of the base layer, and wherein, after the depositing and heating steps, the base layer has a second portion disposed away from the first surface and having a lower density compared to the first portion, the first portion having a thickness in the range of 0.5 to 10 mm, and the second portion having a thickness in the range of 3 to 40 mm.

17. The method of claim 16 wherein the second portion has a lower density compared to the first portion.

18. The method of claim 16 wherein the thickness of the second portion is greater than the thickness of the first portion.

19. The method of claim 16 wherein the base layer has a generally uniform density prior to the depositing step.

20. The method of claim 16 wherein, prior to the depositing step, the base layer has a consolidated portion proximate the first surface and a resilient portion disposed away from the first surface.

* * * * *